(12) United States Patent
Mitsui

(10) Patent No.: US 8,427,683 B2
(45) Date of Patent: Apr. 23, 2013

(54) INFORMATION PROCESSING APPARATUS, CONTROL METHOD, AND STORAGE MEDIUM

(75) Inventor: Akihiro Mitsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 508 days.

(21) Appl. No.: 12/781,707

(22) Filed: May 17, 2010

(65) Prior Publication Data

US 2010/0296122 A1 Nov. 25, 2010

(30) Foreign Application Priority Data

May 19, 2009 (JP) .................. 2009-121007

(51) Int. Cl.
*G06K 15/00* (2006.01)
*H04N 1/00* (2006.01)
*G06F 3/12* (2006.01)
*G11C 7/00* (2006.01)

(52) U.S. Cl.
USPC ............ 358/1.15; 358/1.14; 358/1.6; 726/21; 726/28

(58) Field of Classification Search ........................ None
See application file for complete search history.

(56) References Cited

U.S. PATENT DOCUMENTS

| 2006/0232811 A1* | 10/2006 | Yokoyama ............... 358/1.14 |
| 2006/0268306 A1* | 11/2006 | Kojima et al. ........... 358/1.13 |
| 2006/0282772 A1* | 12/2006 | Chamberlin et al. ......... 715/700 |
| 2009/0021771 A1 | 1/2009 | Salgado et al. |

FOREIGN PATENT DOCUMENTS

| EP | 1710680 A2 | 10/2006 |
| JP | 2004-192219 | 7/2004 |
| JP | 2007-122137 | 5/2007 |
| KR | 10-2007-0051512 A | 5/2007 |

* cited by examiner

*Primary Examiner* — Thomas Lett

(74) *Attorney, Agent, or Firm* — Canon USA Inc. IP Division

(57) ABSTRACT

To provide a system capable of preventing unintended update of default values of print settings and capable of improving the usability in image forming processing, an information processing apparatus according to the present invention includes a CPU that accepts a display instruction from a user to display an interface of a printer driver and does not permit the user to update the default values in a case where the accepted display instruction is a first display instruction for updating the default values relating to the print settings of the printer driver and the update of the default values is not permitted.

12 Claims, 17 Drawing Sheets

```xml
<?xml version="1.0" enooding="UTF-8" ?>
<psf:PrintTicket
xmlns:psf="http://schemas.microsoft.com/windows/2003/08/printing/
printschemaframework"
xmlns:xsi="http://www.w3.org/2001/XMLSchema-instance"
xmlns:xsd="http://www.w3.org/2001/XMLSchema" version="1"
xmlns:psk="http://schemas.microsoft.com/windows/2003/08/printing/
printschemakeywords">
  <psf:Feature name="psk:PageMediaSize">
    <psf:Option name="psk:NorthAmericaLetter">
      <psf:SooredProperty name="psk:MediaSizeWidth">
        <psf:Value xsi:type="xsd:integer">215900</psf:Value>
      </psf:SooredProperty>
      <psf:SooredProperty name="psk:MediaSizeHeight">
        <psf:Value xsi:type="xsd:integer">279400</psf:Value>
      </psf:SooredProperty>
    </psf:Option>
  </psf:Feature name="psk:PageOrientation">
    <psf:Option name="psk:Portrait" />
  </psf:Feature>
  <psf:ParameterInit name="psk:JobCopiesAllDocuments">
    <psf:Value xsi:type="xsd:integer">1</psf:Value>
  </psf:ParameterInit>
</psf:PrintTicket>
```

INFORMATION PROCESSING APPARATUS, CONTROL METHOD, AND STORAGE MEDIUM

BACKGROUND OF THE INVENTION

1. Field of the Invention

The present invention relates to an information processing apparatus that can control processing for enabling users to update default values of print settings for a printer driver. The present invention further relates to a control method and a computer-executable storage medium, which are usable to control the information processing apparatus.

2. Description of the Related Art

When users want to print document data and graphics data after the users have generated the data on a computer, it is general to activate a printer driver installed on the computer to convert print data (i.e., data to be rendered) into printer language data and transmit the printer language data to a printer. When a user changes and/or inputs setting values via a user interface that can be provided by an application or a printer driver, print settings (sheet type, two-sided printing, color printing, selections of sheet feeding cassette, etc.) are written in a printer language based on the setting values determined by the user and transmitted as printer language data.

The print settings initially set, when a printer driver is installed, are standard default values that are stored in the printer driver beforehand. The standard default values are fundamental values usable for a "reset to default" function of a user interface provided by the printer driver. Further, according to Windows® OS provided by Microsoft Corporation, print settings are stored in a registry database. In this case, not only the print settings dedicated to each user but also the standard default values are stored in the registry. The standard default values stored in the registry can be changed by an administrator who can change "standard settings." The standard default values are usable for initial print settings in a case where a printer driver of a shared printer is downloaded from a server to a client.

It is generally required to complete the print settings every time when each user instructs a printer to perform printing. Alternatively, users can update default values of the print settings beforehand. According to Windows®, users can open various user interfaces of a printer driver from a printer folder to perform settings. The print setting values having been set by a user are stored in the registry, and can be used as default values of print settings usable in an application. For example, when a user wants to fix the sheet size to a predetermined size (e.g., B5), and further when the user wants to constantly perform monochrome printing, the user generally performs print settings using a printer folder beforehand and updates the default values of the print settings.

When an IT administrator distributes a printer driver from a print server, the IT administrator may want to designate predetermined default values of print settings beforehand. For example, the IT administrator may request users to always select 2UP or two-sided printing for the purpose of decreasing the consumption amount of sheets. In such cases, the IT administrator changes the values of the above-described "standard settings" and prepares a shared printer driver based on the changed print settings to let each client download and install the shared printer driver.

However, each user can freely opens user interfaces of a printer driver from a printer folder and update the default values according to user's preference. Therefore, a print result obtained by each client may not the one that was initially intended by the IT administrator. To solve the above-described problem, as discussed in Unexamined Patent Application Laid-Open No. 2004-192219, there is a conventional method for enabling an administrator to lock print setting data of a printer driver to prevent the setting values from being changed by users.

The above-described method is useful to surely fix the values of the print settings. However, there may be a lesser degree of freedom for individual users. For example, in a case where some documents to be distributed for common use in an office are printed by N-up or two-sided monochrome printing and another documents to be delivered to individual clients are printed by one-sided and color printing, it is necessary to install two printer drivers because print settings need to be fixed and cannot be changed. Hence, according to a conventional method discussed in Unexamined Patent Application Laid-Open No. 2007-122137, even in a case where a user updates default values stored in a registry having been set by a user, print setting contents of the "standard settings" are rewritten in synchronization with the registry having been set by the user at predetermined timing.

However, there may be a problem if the print settings of the "standard settings" are forcibly synchronized at predetermined timing. For example, a user may perform print settings before generating a document. In such a case, according to the above-described method, the print settings will be changed at timing not intended by the user while the user is still writing the document. As a result, the user will not be able to obtain a printed product according to the print settings that the user has designated.

Further, even in a case where the above-described synchronization timing is arbitrarily changeable, if a synchronization time is long or the frequency of the synchronization is lower, a state where the default values have been updated by a user will last for a long time. It becomes difficult to force users to use the print settings that are designated by the IT administrator. On the other hand, if the synchronization time is short or the frequency of the synchronization is higher, the standard settings will soon return to the original values and, therefore, it becomes difficult for users to freely change the default values of the print settings.

SUMMARY OF THE INVENTION

According to an aspect of the present invention, an information processing apparatus includes a printer driver that can generate print data to be transmitted to a printing apparatus according to a print instruction of an application. The information processing apparatus according to the present invention includes a reception unit configured to accept a display instruction from a user to display a user interface of the printer driver, a determination unit configured to determine whether the display instruction accepted by the reception unit is a first display instruction for updating default values relating to print settings of the printer driver or a second display instruction corresponding to the print instruction of the application, and a control unit configured to cause a display unit to display a user interface that can accept an update instruction for updating the default values from the user in a case where the determination unit determines that the display instruction is the first display instruction and the update of the default values is permitted, cause the display unit to display a user interface that does not accept the update instruction in a case where the determination unit determines that the display instruction is the first display instruction and the update of the default values is not permitted, and cause the display unit to display a user interface that can accept a change instruction from the user to change the print settings from the default values to other values and does not permit the user to update the default values in a case where the determination unit determines that the display instruction is the second display instruction.

The present invention can provide a system capable of preventing unintended update of default values of print settings and capable of improving the usability in image forming processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates a user interface that can be provided by a configuration module of a printer driver according to an exemplary embodiment of the present invention.

FIG. 14 illustrates a user interface of the configuration module, which includes controls in a gray-out state, in a case where an item other than "permit" is selected from a field "value change permission with respect to printer properties" in the administrator settings according to an exemplary embodiment of the present invention.

FIG. 17 illustrates an example of an XML format print ticket, which represents print settings of the XPSDry print processing system, according to an exemplary embodiment of the present invention.

DESCRIPTION OF THE EMBODIMENTS

Various exemplary embodiments, features, and aspects of the invention will be described in detail below with reference to the drawings.

Figure 1:
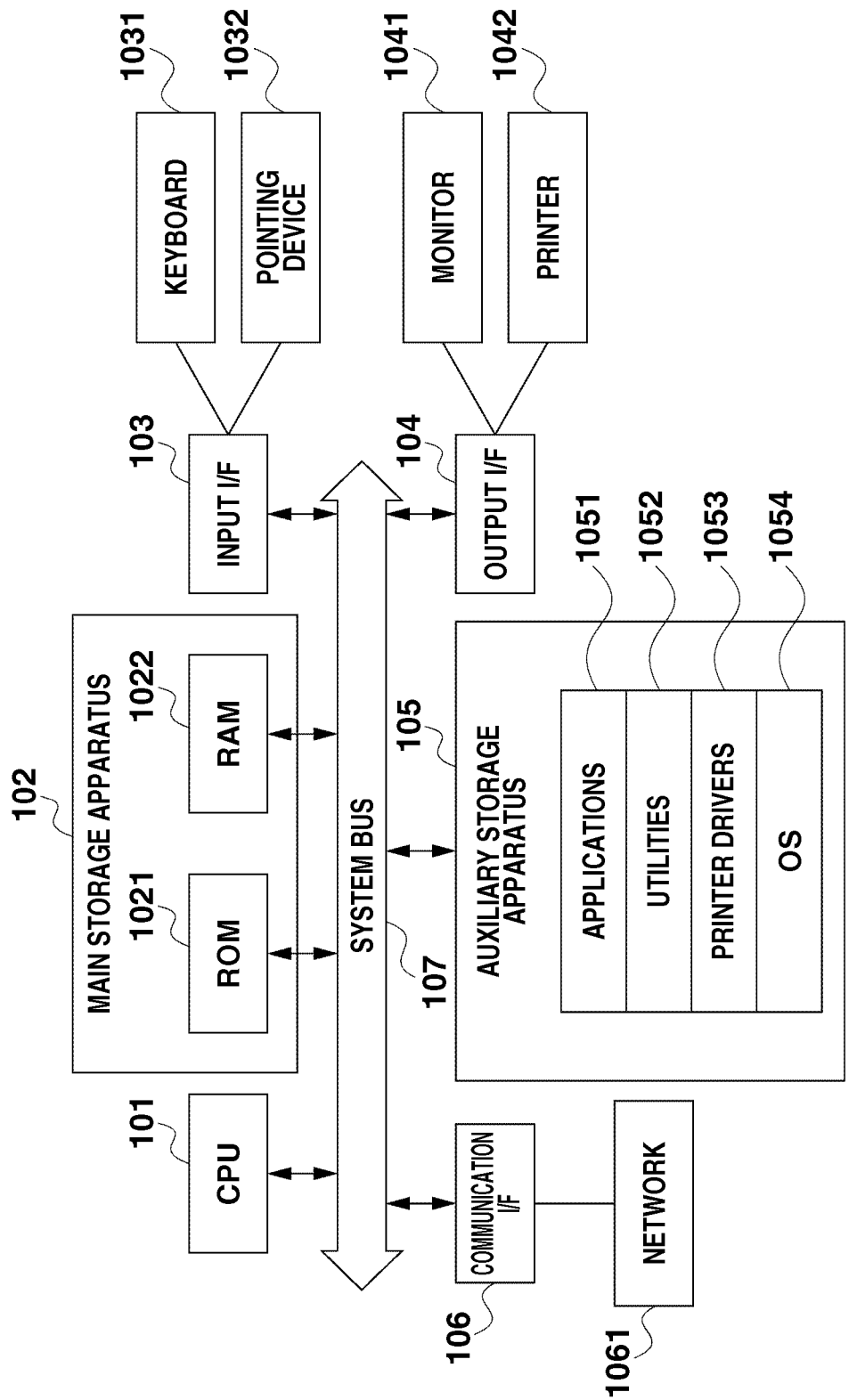
FIG. 1 is a block diagram illustrating an example hardware and software configuration of a computer system according to an exemplary embodiment of the present invention.

FIG. 1 is a block diagram illustrating a general computer system that can operate as an information processing apparatus according to a first exemplary embodiment of the present invention. The information processing apparatus employable in the present invention can be a single device, a system including a plurality of devices, or a system that can be connected to a network to perform processing.

A central processing unit (CPU) 101 can control various operations to be performed by the information processing apparatus according to software programs stored in a read only memory (ROM) 1021 or a random access memory (RAM) 1022 provided in a main storage apparatus 102 or in an auxiliary storage apparatus 105. The RAM 1022 can function as a work area when the CPU 101 performs various processing.

The auxiliary storage apparatus 105 stores applications 1051, utilities 1052, printer drivers 1053, and an operating system (OS) 1054. A keyboard 1031 and a pointing device 1032 (which is represented by a mouse and a touch panel) are input devices that enable users to input various instructions to the computer via an input interface (I/F) 103. An output I/F 104 is an interface that can output data to output devices, such as a monitor 1041 and a printer 1042. A local I/O is usable for a direct connection to the printer 1042. A communication I/F 106 is usable for connection via a network 1061 to the printer 1042. A common data system bus 107 is usable for transmission and reception of data.

Figure 2:
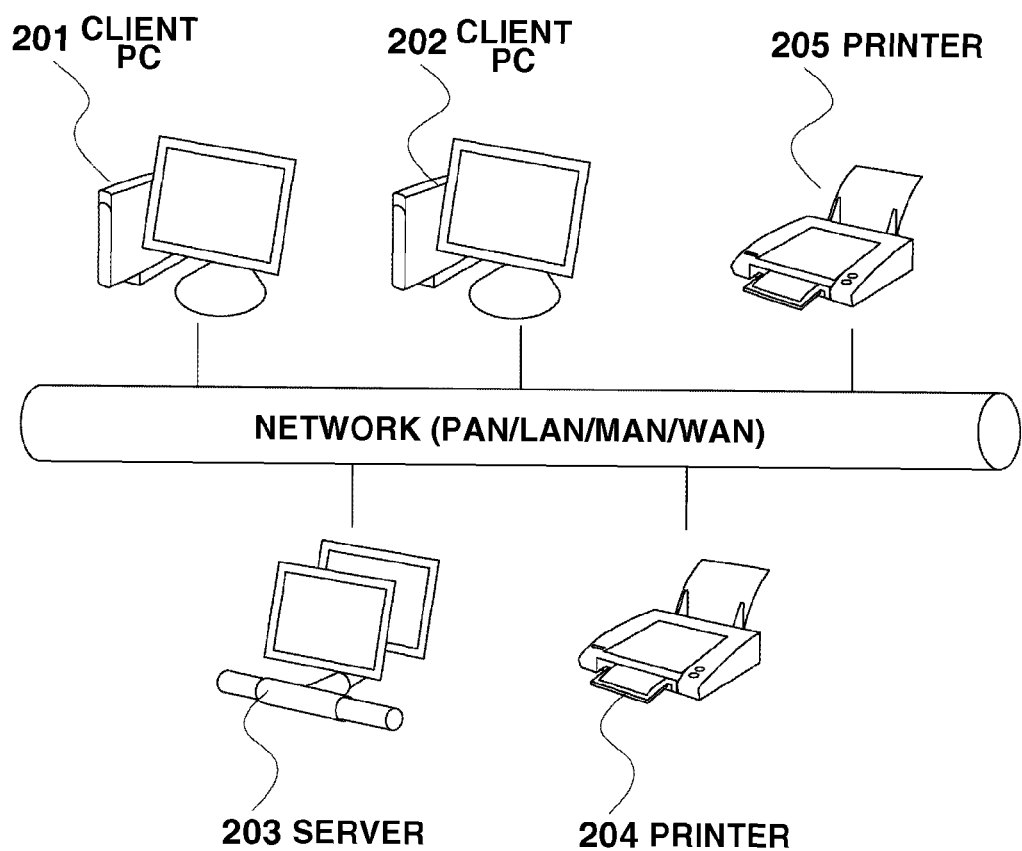
FIG. 2 illustrates a network configuration according to an exemplary embodiment of the present invention, in which a plurality of clients, a server, and a printer are connected to each other.

FIG. 2 simply illustrates an environment of the network 1061 according to an exemplary embodiment of the present invention, in which at least one client PC 201/202, which can perform printing to generate documents and images, is connected to the network. A server 203, which can manage user information of the client PC 201/202 and printer information, can be connected to the network. Each of the client PC 201/202 and the server 203 has a configuration illustrated in the block diagram of FIG. 1.

At least one printer 204/205 is connected to the network. Although the printer 205 is physically connected to the network, the printer 205 is in an off-line state where the printer 205 cannot be operated by the client PC 201/202 or the server 203. For example, the network according to the present invention is a small-scale network, such as personal area network (PAN), local area network (LAN), metropolitan area network (MAN), and wide area network (WAN)). Alternatively, the network according to the present invention can be a large-scale network. All of the above-described devices are connected to the network.

In the present exemplary embodiment, if a user inputs a print instruction to the client PC 201/202, the print instruction is sent directly or via the server 203 to the printer 204. The printer 204 performs print processing to output a print product. To enable users to commonly use the printer 204 via the server 203, a dedicated printer driver 1053 can be installed beforehand on the server 203. A user of the client PC 201/202 can designate the shared printer 204 and download the corresponding printer driver 1053 from the server 203 and install the downloaded printer driver 1053 on the client PC 201/202.

Figure 3:
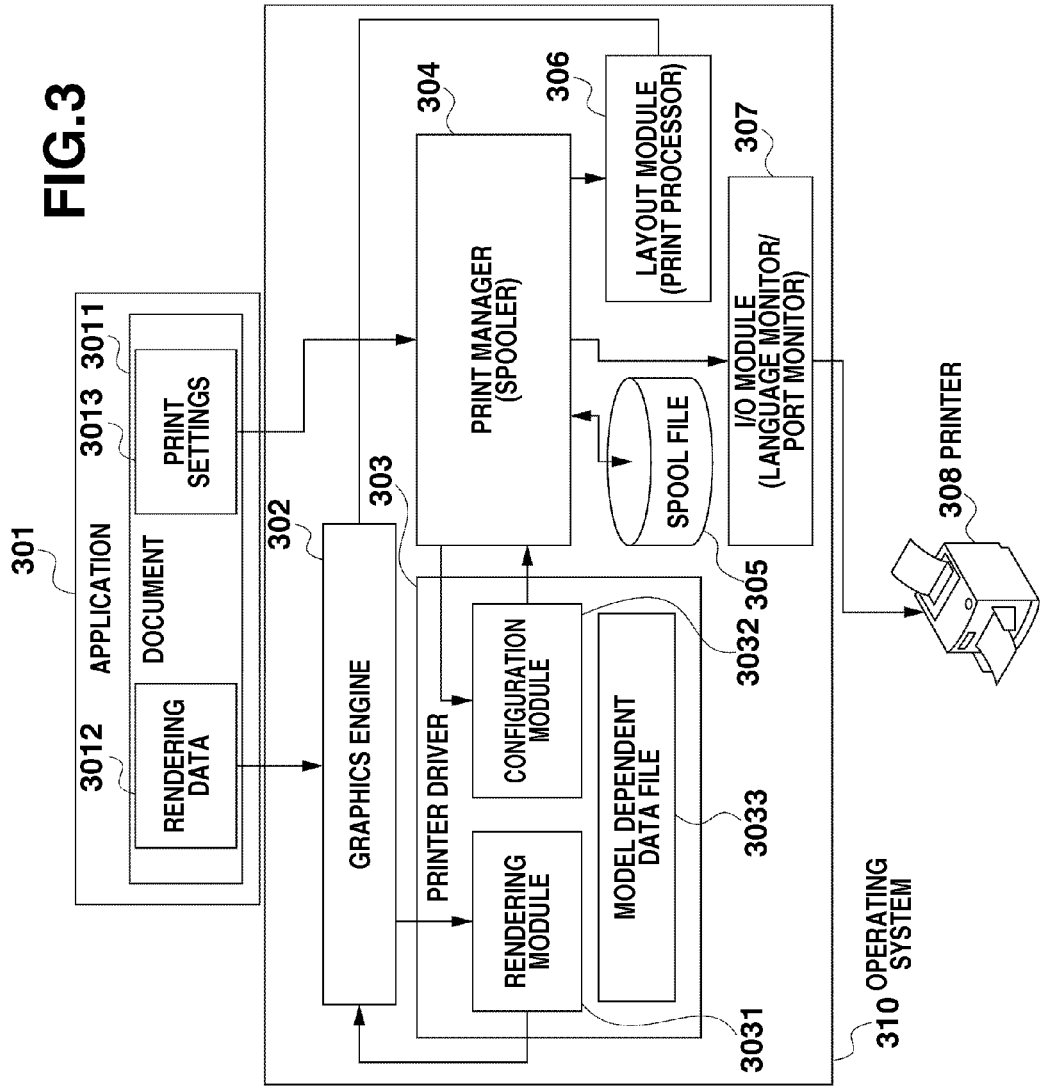
FIG. 3 is a block diagram illustrating a print processing system including a general computer according to an exemplary embodiment of the present invention.

FIG. 3 illustrates a print processing system including a general information processing apparatus that can be, for example, realized by the client PC 201/202. An operating system (OS) 310 is the OS 1054 stored in the auxiliary storage apparatus 105 illustrated in FIG. 1. A graphics engine 302 and a print manager 304 are modules included in the OS 310. A printer driver 303 is one of the printer drivers 1053 stored in the auxiliary storage apparatus 105 illustrated in FIG. 1. An application 301 is one of the applications 1051 stored in the auxiliary storage apparatus 105 illustrated in FIG. 1.

A monitor of the output device 104 displays a document 3011 when the document 3011 is generated by a user using the application 301. The user can transmit a print instruction for the document 3011 to a printer 308 by manipulating the input device 103 (e.g., the keyboard or the mouse). The user implements the print instruction through three processes of selecting a printer, changing print settings, and converting document data into rendering data. First, as a process of selecting a printer, the user selects the printer driver 303 that corresponds to a printer that performs printing.

Next, the user changes print settings 3013. In this case, the user instructs the print processing system to display a user interface on the monitor 1041. The monitor 1041 displays default values as the print settings 3013 to be applied to the document 3011. Then, the user changes the contents of the print settings 3013 from the default values to arbitrary values that are suitable to obtain a final print result that the user wants, by using a user interface of an application or a printer driver.

Then, according to the changes added to the print settings 3013, the user performs the conversion of rendering data 3012. The items to be set in this case, for example, include settings relating to output sheet size, two-sided/one-sided printing, and monochrome/color printing. The print settings 3013 can be stored temporarily on the RAM 1022, as a binary data structure or as a markup language XML. The storage form of the print settings 3013 is variable depending on the printer driver 303 or the OS 310. If the user interface is closed, the changed print settings are discarded. Therefore, every time the user interface is reopened, the default values are initially set.

After completing the above-described processing for changing the print settings 3013, the user instructs the OS 310 to execute print processing. The OS 310 performs rendering processing for the designated printer driver 303 via the graphics engine 302. If layout processing is designated in the print settings 3013, the OS 310 generates a temporary spool file 305 and activates a layout module 306 before activating a rendering module 3031 of the printer driver 303. The layout processing includes changing the order of sheets and pasting (or disposing) a plurality of pages on one sheet. After the above-described layout processing by the layout module 306 is completed, the OS 310 performs rendering processing for the printer driver 303.

The printer driver 303 causes the rendering module 3031 to convert the received rendering data 3012 into print data written in a data language (i.e., a printer control language) that can be processed by the printer 308. In this case, the printer driver 303 also converts the print settings 3013 into printer control language data. In many cases, both the rendering module 3031 and a configuration module 3032 are prepared as modules commonly usable for a plurality of printers that are different in type. The printer driver 303 includes a model-dependent data file 3033 that includes descriptions relating to differences in respective models.

The rendering module 3031 and the configuration module 3032 can refer to the model dependent data file 3033 at appropriate timing. The OS 310 can store each of the converted data as a spool file 305. The print manager 304 acquires the spool file 305 and performs schedule management for the print processing as a print job file. When the printer 308 is ready for the print processing, the print manager 304 transmits print job data to the printer 308 via an I/O module 307. As described above, according to a user's print instruction input via the application, print data can be converted into printer language data and the printing can be performed.

The server 203 and the client PC 201/202 may differently configure the processing to be performed by the above-described print processing system. In a case where the client PC 201/202 connected to the server 203 performs the rendering processing for converting the print data into printer language data, the client PC 201/202 transmits the spool file 305 having been written in a printer language to the print manager 304 of the server 203. Then, the server 203 outputs the spool file 305 via the I/O module 307 to the printer 308.

In a case where the client PC 201/202 connected to the server 203 performs the server 203 side rendering processing, the client PC 201/202 causes the graphics engine 302 to temporarily generate a spool file 305. Then, the client PC 201/202 transmits the generated temporary spool file 305 to the print manager 304 of the server 203. The print manager 304 of the server 203 performs rendering processing for the printer driver 303, based on the received temporary spool file 305, using the graphics engine 302.

Figure 5:
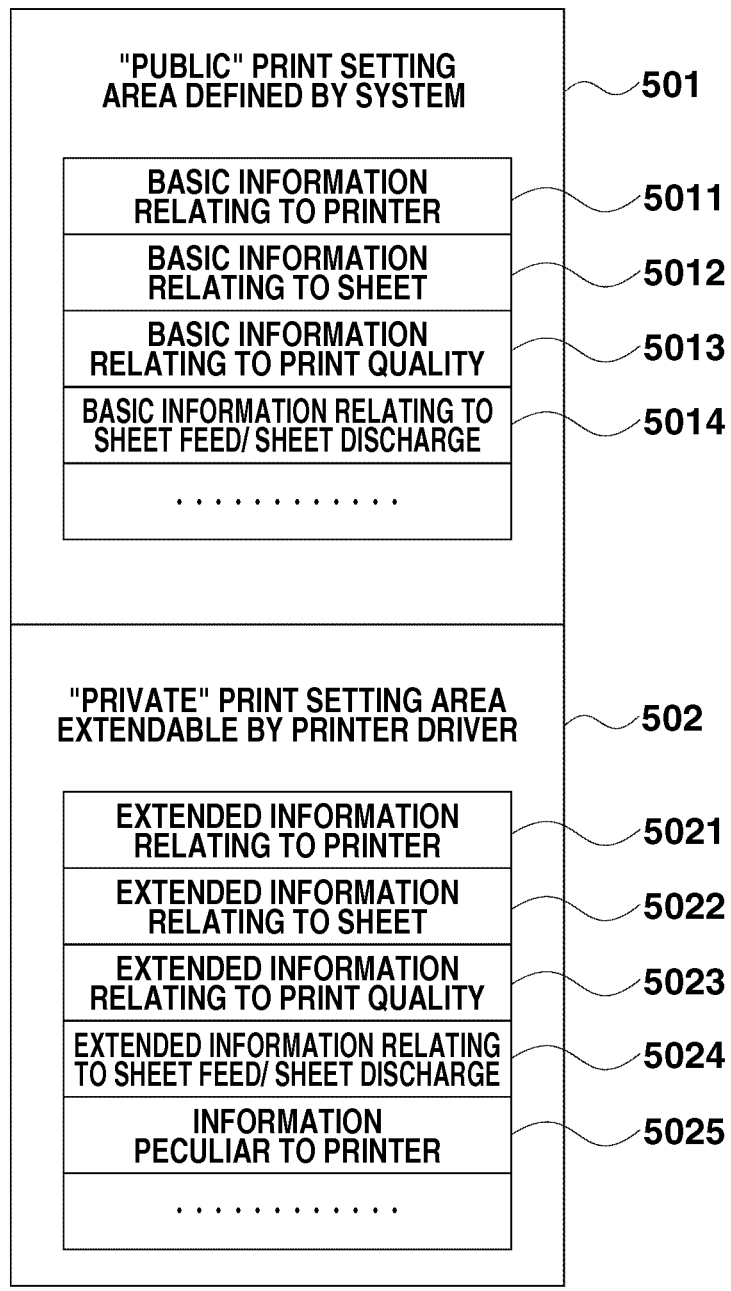
FIG. 5 is a block diagram illustrating a data structure of print settings according to an exemplary embodiment of the present invention.
Figure 6:
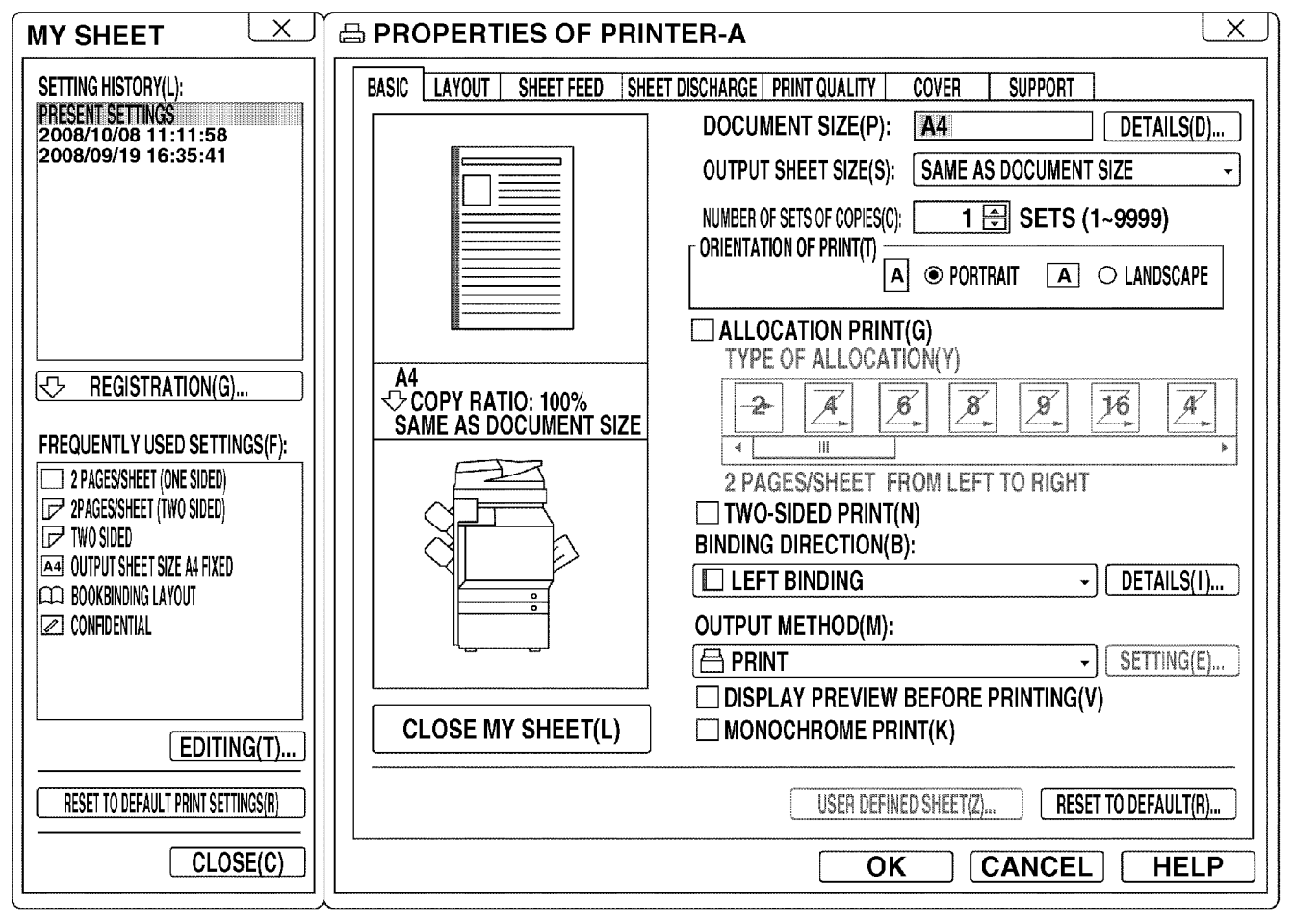

To change the print settings 3013 of the document 3011, users can use an application to directly rewrite the print settings 3013 or can use a user interface (see FIG. 6) that can be provided by the configuration module 3032 of the printer driver 303. The print settings 3013 include a "Public" setting area that is defined by the system and a "Private" setting area that is extended by the printer driver, as illustrated in FIG. 5.

The "Public" setting area includes basic settings, such as selection of sheet size and sheet feeding stage and switching between color and monochrome, which relate to the print processing. The "Private" setting area includes sheet discharge functions and precise color adjustment functions that can be designated as optional settings for each printer. It is difficult for the application to check extended settings uniquely settable by each printer driver 303.

The print settings 3013 that the application can directly change are limited to the "Public" setting area defined by the system. Therefore, it is general that the application displays a user interface that can be provided by the configuration module 3032 of the printer driver 303 and enable users to change the print settings 3013. Further, the configuration module 3032 provides an application programming interface (API) in addition to the user interface. Therefore, instead of displaying the user interface, it may be useful to change the "Private" setting area of the print settings 3013 from the outside.

Further, in addition to the above-described changes added to the print settings 3013, it is possible to update default values of print settings, such as standard settings dedicated to each user, which are provided in the OS 310, and standard settings dedicated to each driver. The standard settings dedicated to each user can be referred to as "user default values" and the standard settings dedicated to each driver can be referred to as "standard default values."

The user default values are set beforehand by individual users and can be displayed on a user interface by an application as default values in print settings. The standard default values are set beforehand by an administrator. For example, a first log-in user can use the standard default values as initial print settings. Further, the standard default values can be used as initial print settings when a printer driver is newly downloaded from a server. A user interface that can be provided by the configuration module 3032 of the printer driver 303, which is called from the OS 310, is usable to set the user default values and the standard default values, instead of performing the settings via an application.

Figure 7:
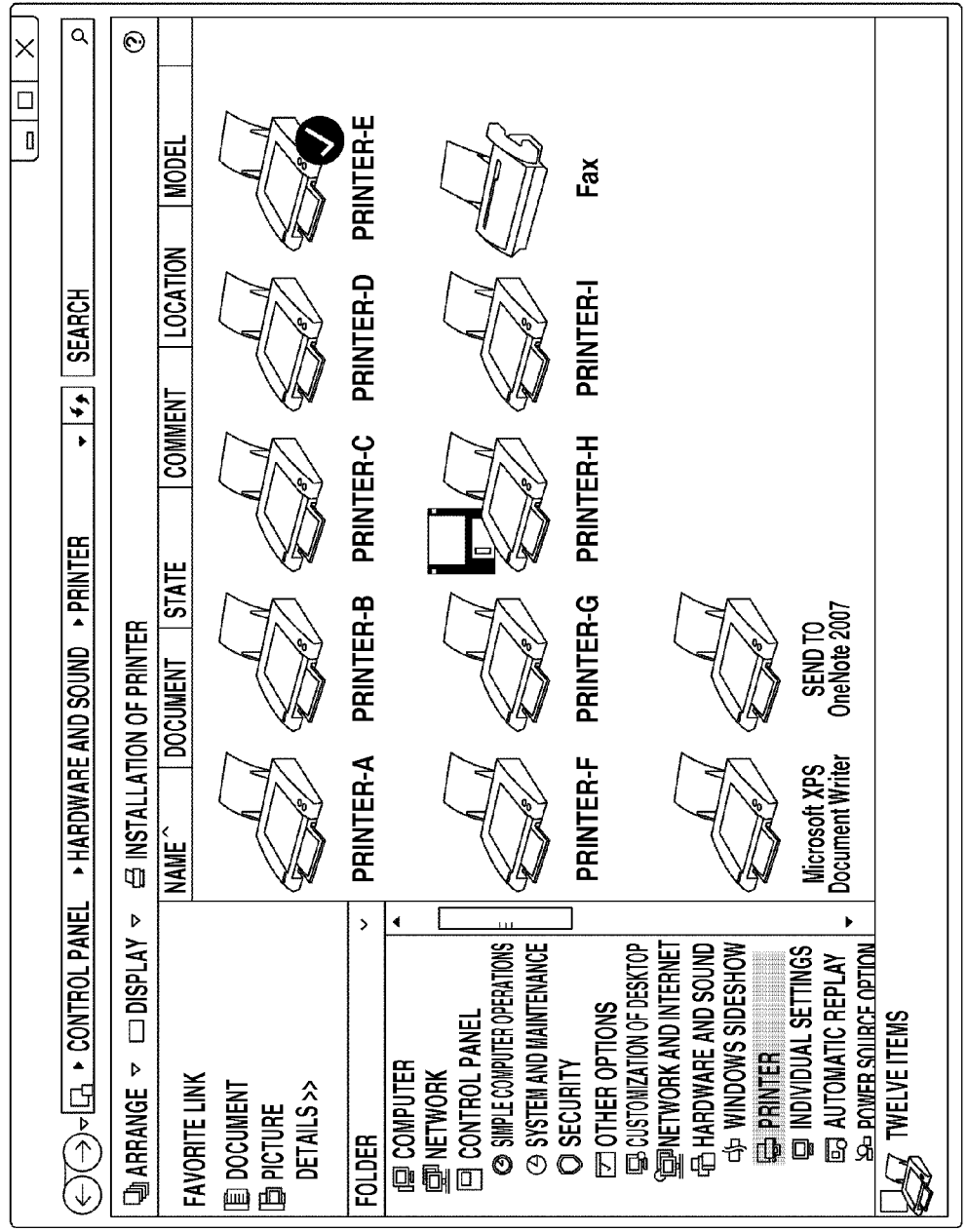
FIG. 7 illustrates a printer folder that is usable for an integrated printer management to store standard settings of an operating system according to an exemplary embodiment of the present invention.
Figure 8:
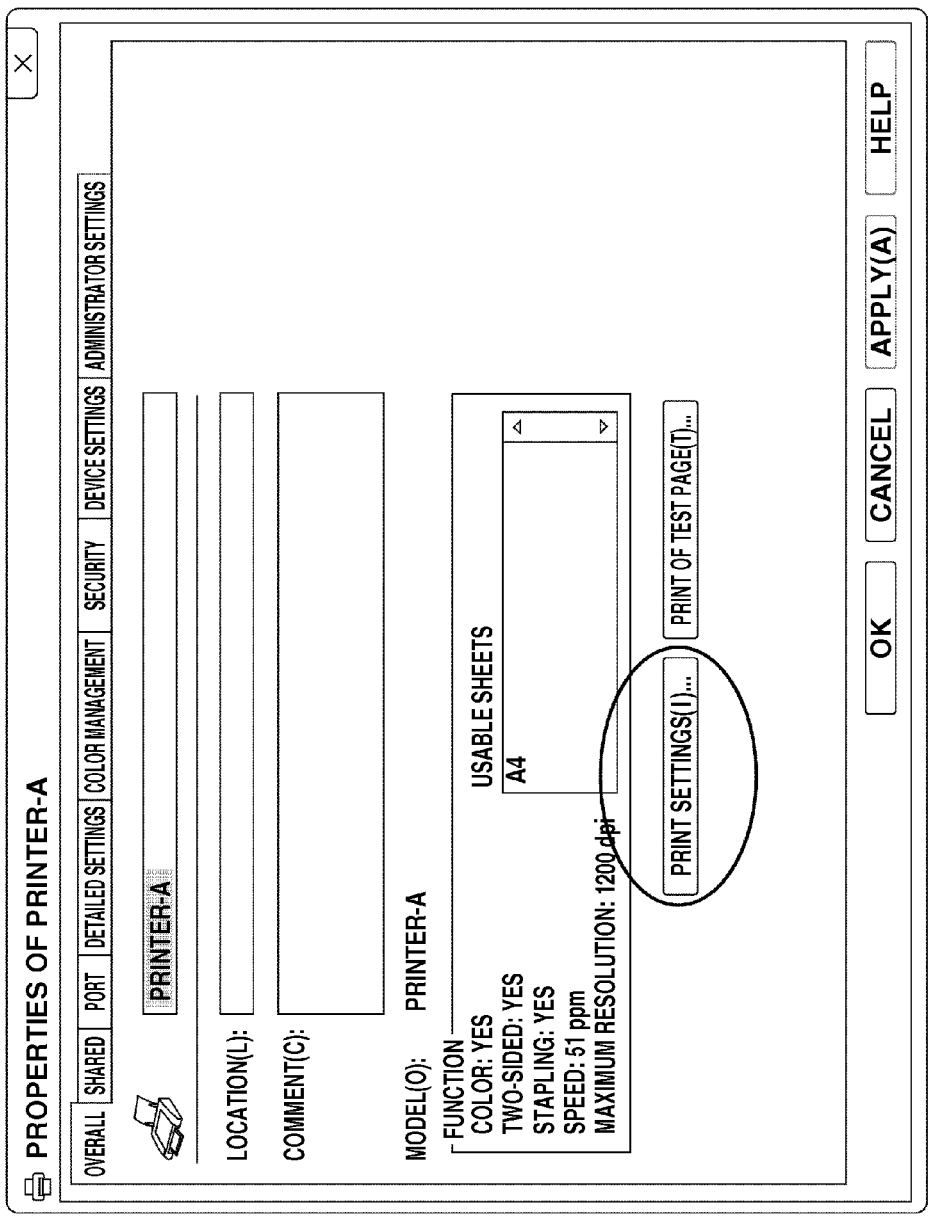
FIG. 8 illustrates a user interface including buttons that can be operated to open a user interface of the configuration module of the printer driver, to store user default print settings, according to an exemplary embodiment of the present invention.
Figure 9:
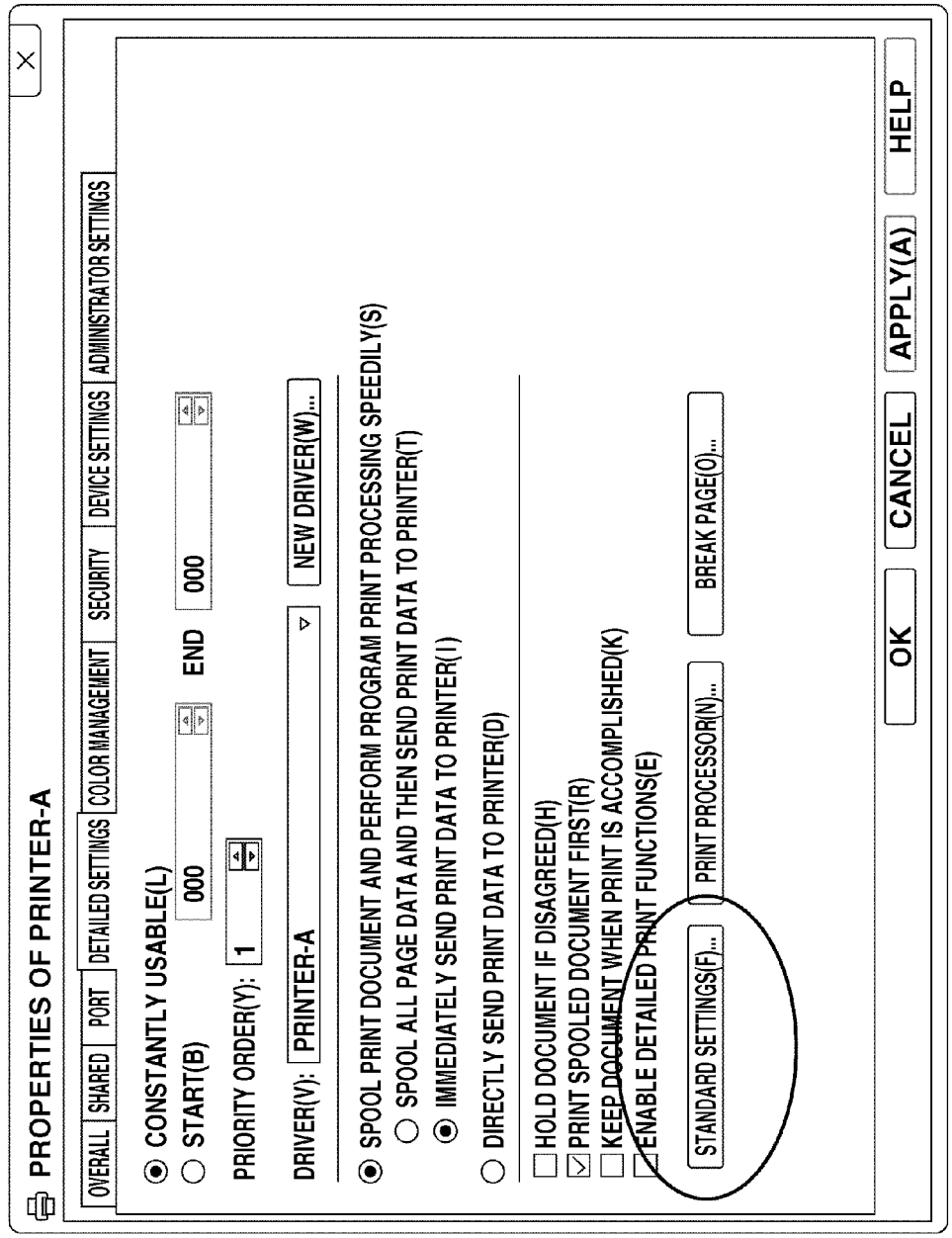
FIG. 9 illustrates a user interface including buttons that can be operated to open a user interface of the configuration module of the printer driver, to store standard default print settings, according to an exemplary embodiment of the present invention.

The OS 310 integrally manages each printer as a printer folder (see FIG. 7). The OS 310 selects a printer folder of a designated printer according to a user's instruction and performs a display instruction of a user interface to be used to update the default values. For example, when a user presses a print setting button in a property window of the selected printer folder (see FIG. 8), a user interface of the configuration module 3032 can be displayed to enable the user to update the user default values. Further, for example, when the user presses a standard setting button provided on a detailed setting tab sheet of the property window of a printer folder (see FIG. 9), a user interface of the configuration module 3032 can be displayed to enable the user to update the standard default values.

Figure 10:
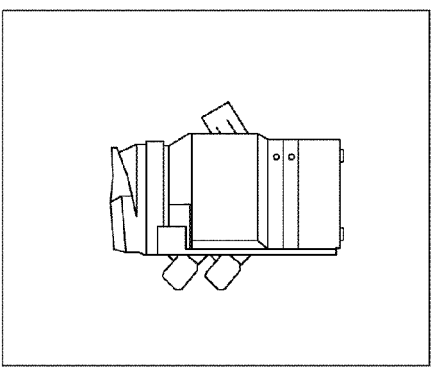
FIG. 10 illustrates a user interface that can be provided by the configuration module of the printer driver, which enables only an administrator to perform settings, according to an exemplary embodiment of the present invention.

The user interfaces that can be provided by the configuration module 3032 of the printer driver 303 include not only the user interface usable for print settings (see FIG. 6) but also a user interface that can be exclusively used by the administrator to perform settings (see FIG. 10). The user interface illustrated in FIG. 10 enables the administrator to perform optional hardware settings for the printer 308 and special settings for the driver. The above-described printer folder of the OS 310 can be referred to when the administrator designates the user interface to perform settings.

Example setting processing for determining whether to permit users to update default values of the print settings is described below with reference to a flowchart illustrated in FIG. 11. To realize the following processing in respective steps, the CPU 101 executes the configuration module 3032 of the printer driver 303 and controls each of related constituent components.

In step S1101, the CPU 101 accepts an opening instruction of an administrator's user interface from a printer folder based on a user's operation. Before accepting the instruction, the OS 310 determines whether a user has a valid administrator authority. If it is determined that the user's administrator authority is valid, the CPU 101 accepts a user name and a password that are input by the administrator. Even when the user does not have any valid administrator authority, if both the name and the password entered by the user agree with administrator information registered beforehand, the CPU 101 regards the user as having a valid administrator authority in step S1102.

In step S1102, to check the administrator authority of the user who has input the instruction, the CPU 101 determines whether the user who has requested the administrator's user interface has the administrator authority. If it is determined that the user has the administrator authority (YES in step S1102), the processing proceeds to step S1104. If it is determined that the user does not have any valid administrator authority (NO in step S1102), the processing proceeds to step S1103.

In this case, the CPU 101 uses the API provided by the OS 310 for the above-described administrator authority determination. The CPU 101 acquires, from the API of the OS 310, an access token that is associated with the process of the configuration module 3032 (the currently executing module). Then, the CPU 101 acquires type information relating to the access token by designating the access token with the API of the OS 310, and determines the type of the acquired access token.

Figure 12:
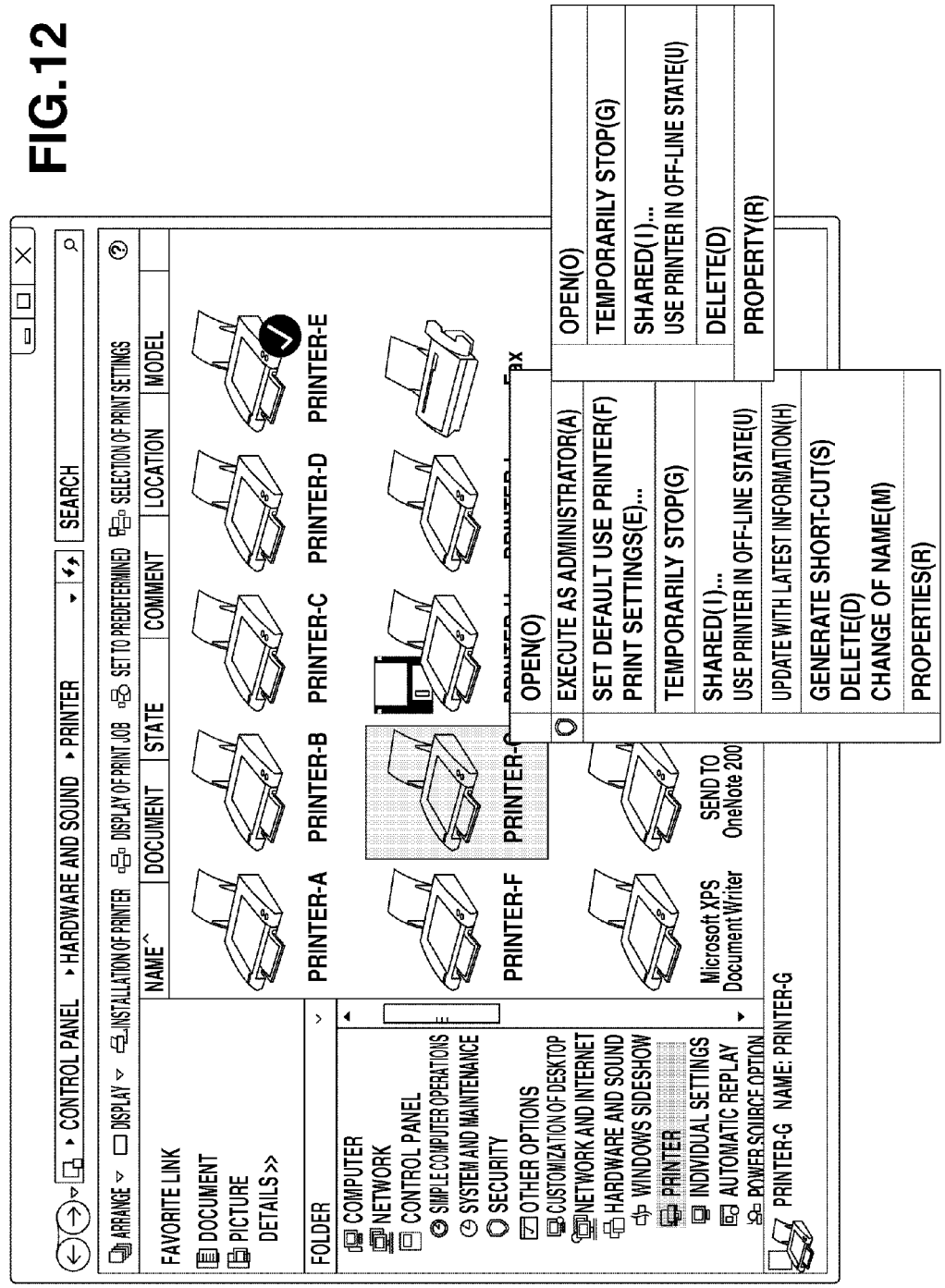
FIG. 12 illustrates a menu screen that can be used to open a user interface from a printer folder of the operating system based on an administrator authority according to an exemplary embodiment of the present invention.

As a result, the CPU 101 can determine whether the opening request of the user interface is based on valid administrator authority. In other words, the CPU 101 can check the validity of the administrator authority of the user. When the administrator authority of the user is valid, the determination result in step S1102 becomes YES. To open the properties of the user interface based on the valid administrator authority, an item "execute as administrator" can be selected from a menu of a printer folder as illustrated in FIG. 12.

In step S1103, the CPU 101 causes the monitor 1041 to display the administrator's user interface in a state where the controls of administrator settings are grayed out and cannot be operated. In this case, whether to permit the user to change the default values is not settable in the following steps. On the other hand, in step S1104, the CPU 101 causes the monitor 1041 to display the administrator's user interface that can accept user's instructions.

Figure 13:
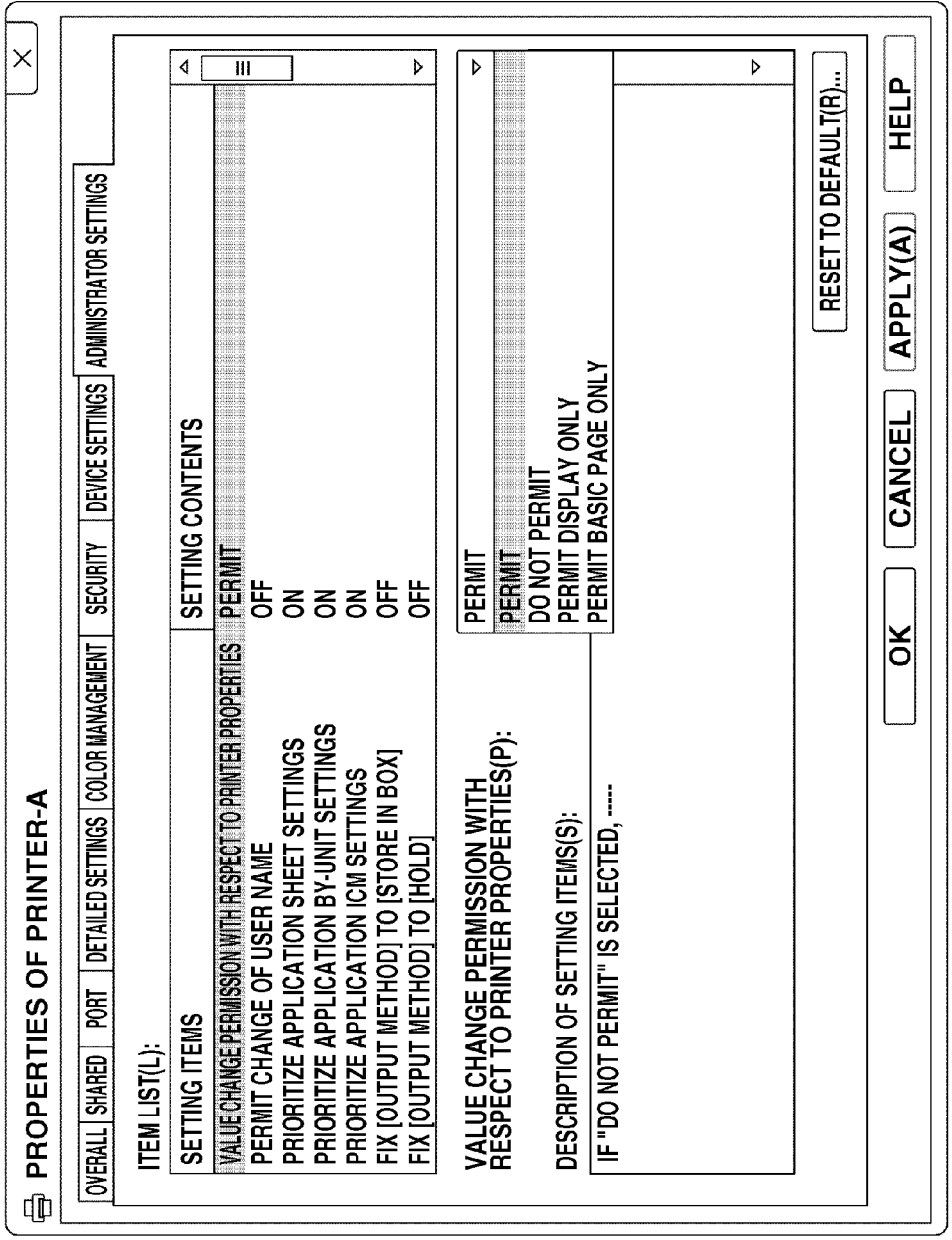
FIG. 13 illustrates a user interface that can be provided by the configuration module, which enables only the administrator to perform administrator settings for the printer driver, according to an exemplary embodiment of the present invention.

FIG. 13 illustrates an administrator setting dialog included in the administrator's user interface. The administrator settings include a plurality of setting items. As a representative setting item according to the present exemplary embodiment, the administrator setting dialog illustrated in FIG. 13 includes a setting item "value change permission with respect to printer properties" (i.e., a setting item whether to permit users to update the default values of the print settings). The setting item "value change permission with respect to printer properties" includes four functions of "permit", "do not permit", "permit display only", and "permit basic page only."

Figure 15:
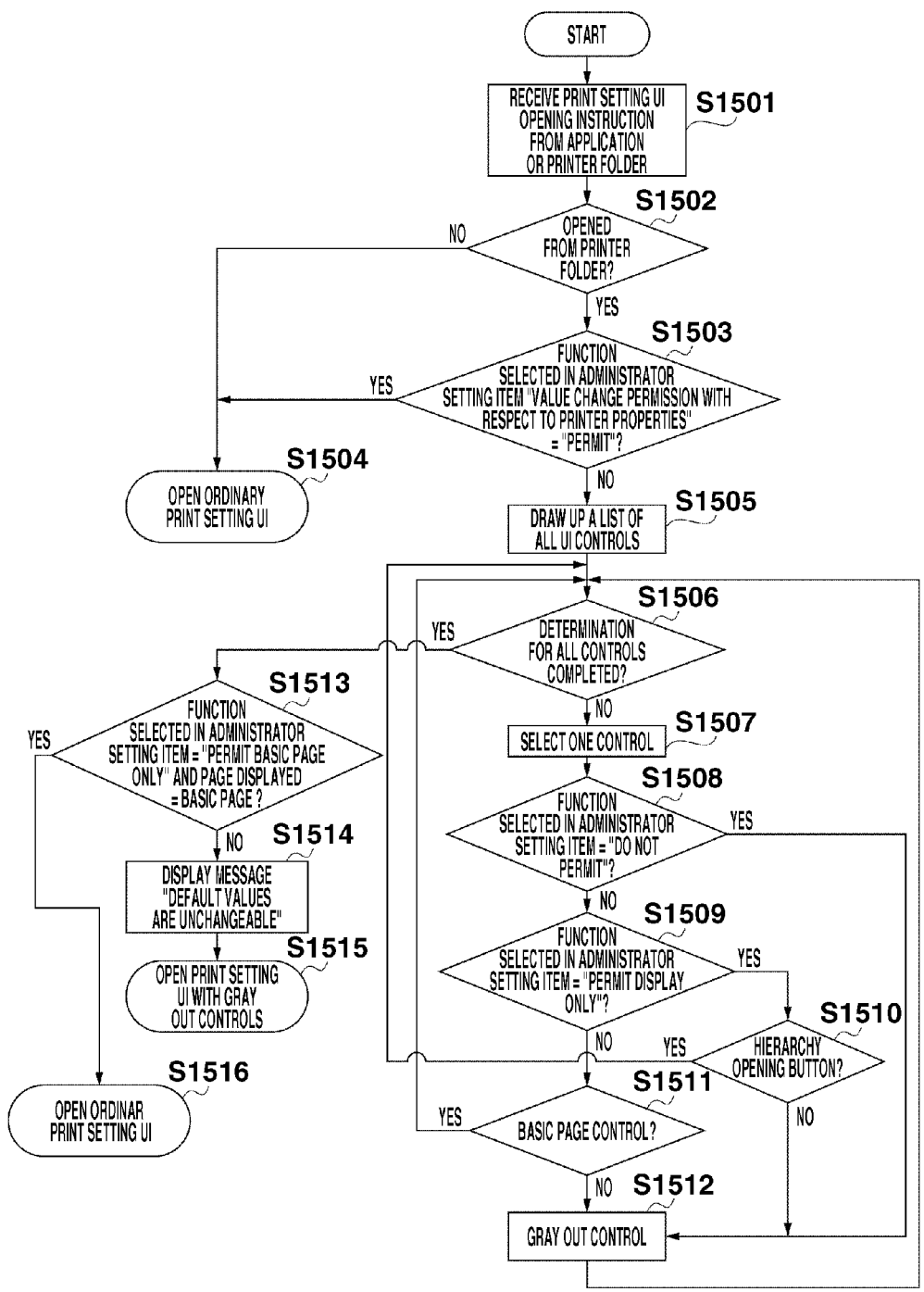
FIG. 15 is a flowchart illustrating processing that can be performed by the configuration module to fix only the user default print settings according to an exemplary embodiment of the present invention.

In step S1105, the CPU 101 selects one of the above-described four functions, according to a user's instruction, from the displayed menu of the setting item "value change permission with respect to printer properties." A detailed operation to be performed by the printer driver 303 according to the above-described choice is described below with reference to a flowchart illustrated in FIG. 15.

If the user presses an OK button after completing the selection with respect to the setting item "value change permission with respect to printer properties", then in step S1106, the CPU 101 stores administrator setting content in a registry database of the OS 310. After completing the data storage processing, the CPU 101 terminates the processing routine illustrated in FIG. 11 in response to closing of the user interface.

Through the above-described processing, the setting for determining whether to permit users to update the default values is accomplished. Further, in a case where the setting is determined so as not to permit users to update the default values, the users are forced to perform printing in a way intended by an IT administrator unless the print settings are changed from the default values to other values on an interface that is activated in response to a print instruction of an application.

Next, example processing for opening the user interface relating to the print settings according to the above-described setting indicating whether to permit users to update the default values is described below according to the flowchart illustrated in FIG. 15. To realize the following processing of respective steps in FIG. 15, the CPU 101 executes the configuration module 3032 of the printer driver 303 and controls each of related constituent components.

In step S1501, the CPU 101 receives an opening instruction (i.e., a display instruction) of the user interface relating to the print settings from an application or a printer folder based on a user's operation. In step S1502, the CPU 101 determines whether the user interface relating to the print settings is opened from a printer folder of the OS 310 referring to the instruction received in step S1501. When the OS 310 calls the configuration module 3032, the OS 310 sends a flag. The flag includes a description indicating whether it is related to default print settings. Therefore, the CPU 101 can execute the processing of step S1502 based on the flag information.

The reason why the CPU 101 performs the above-described determination processing is because the processing is necessary to open the user interface from a printer folder to update the default values of the print settings. If it is determined that the user interface is opened from a printer folder (YES in step S1502), the processing proceeds to step S1503. If it is determined that the user interface is not opened from a printer folder (NO in step S1502), the processing proceeds to step S1504.

For example, if the user interface is opened from an application, the CPU 101 determines that the user interface is not opened from a printer folder. In the present exemplary embodiment, the CPU 101 regards the display instruction as a first display instruction if the display instruction is for updating the default values of the print settings by opening the user interface from a printer folder. The CPU 101 regards other display instruction (e.g., print instruction from an application) as a second display instruction.

Figure 11:
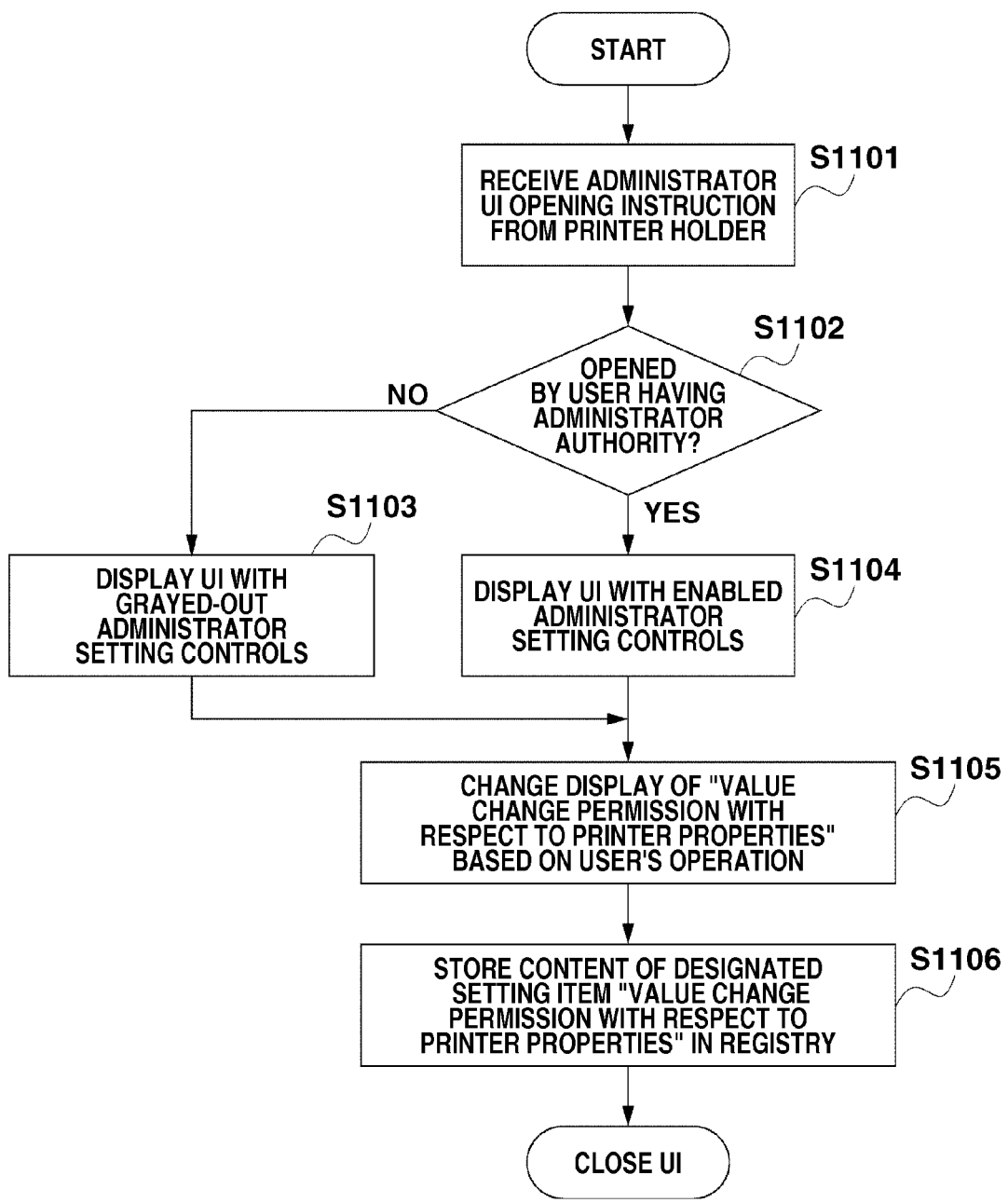
FIG. 11 is a flowchart illustrating setting processing for fixing user default standard settings using administrator settings according to an exemplary embodiment of the present invention.

In step S1503, the CPU 101 reads the content of the setting item "value change permission with respect to printer properties" having been set in the processing illustrated in FIG. 11 from the registry database and determines whether the item "permit" is selected. If it is determined that the item "permit" is selected, i.e., if updating the default values of the print settings is permitted (YES in step S1503), the processing proceeds to step S1504. On the other hand, if it is determined that the item "permit" is not selected (NO in step S1503), the processing proceeds to step S1505.

In step S1504, the CPU 101 opens the user interface with ordinary print settings. In the present exemplary embodiment, the ordinary user interface relating to the print settings is an interface that does not specifically prevent users from updating and changing the default values of the print settings. For example, in a case where the user interface is opened according to a print instruction from an application, the opened interface can accept a user's change instruction (i.e., instruction to change the print settings from the default values to other values).

Therefore, the user can change the print settings from the default values to other values via the interface. The printer performs printing based on the changed print setting values. In this case, the interface does not allow the user to update the default values of the print settings.

On the other hand, in a case where the user interface is opened from a printer folder to update the default values of the print settings and updating the default values is permitted, the opened interface can accept an update instruction for updating the default values. Therefore, the user can update the default values of the print settings via the opened interface.

In step S1505, the CPU 101 draws up a list of all controls that can be operated by the user on the user interface relating to the print settings. Then, in step S1506, the CPU 101 confirms whether the determination with respect to gray-out processing (i.e., processing for brining the control into a disabled state) has been completed for all of the listed controls. If it is determined that the determination has not been completed for all controls (NO in step S1506), the processing proceeds to step S1507. On the other hand, if it is determined that the determination has been completed for all controls (YES in step S1506), the processing proceeds to step S1513.

If there is any control that is not confirmed yet, i.e., when the processing proceeds to step S1507, the CPU 101 selects one of the undetermined controls from the list as a determination target control. In step S1508, the CPU 101 determines whether the function selected in the administrator setting item "value change permission with respect to printer properties" is "do not permit."

If it is determined that the function selected in the administrator setting item "value change permission with respect to printer properties" is not "do not permit" (NO in step S1508), the processing proceeds to step S1509. On the other hand, if it is determined that the function selected in the administrator setting item "value change permission with respect to printer properties" is "do not permit" (YES in step S1508), the processing proceeds to step S1512.

In step S1512, the CPU 101 grays out the determination target control to bring it into a disabled state. In the present exemplary embodiment, when the control is grayed out, the CPU 101 does not accept any operations and instructions from the user. Further, the processing for rejecting user's operations and instruction is not limited to the above-described gray-out processing. For example, the CPU 101 can stop displaying the user interface or any other method can be used.

In step S1509, the CPU 101 determines whether the function selected in the administrator setting item "value change permission with respect to printer properties" is "permit display only." If it is determined that the function selected in the administrator setting item "value change permission with respect to printer properties" is not "permit display only" (NO in step S1509), the processing proceeds to step S1511.

If it is determined that the function selected in the administrator setting item "value change permission with respect to printer properties" is "permit display only" (YES in step S1509), the processing proceeds to step S1510. When the item "permit display only" is selected, the CPU 101 does not permit the user to update the default values of the print settings and only permit the user to display the default values.

In step S1510, the CPU 101 determines whether the determination target control is a control for opening another hierarchy (e.g., a dialog or a property sheet). If it is determined that the determination target control is a control for opening another hierarchy (YES in step S1510), the processing returns to step S1506. On the other hand, if it is determined that the determination target control is not a control for opening another hierarchy (NO in step S1510), the processing proceeds to step S1512. In step S1512, the CPU 101 grays out the determination target control.

The procedure for opening another hierarchy includes calling the API of the OS 310, generating a dialog or a property sheet, and displaying the generated dialog or the generated property sheet. The configuration module 3032 manages the necessity of calling the API of the OS 310 in a list while associating it with the control. Therefore, the CPU 101 can search the list based on information of the control in determining whether the determination target control is a control for opening another hierarchy.

Figure 14:
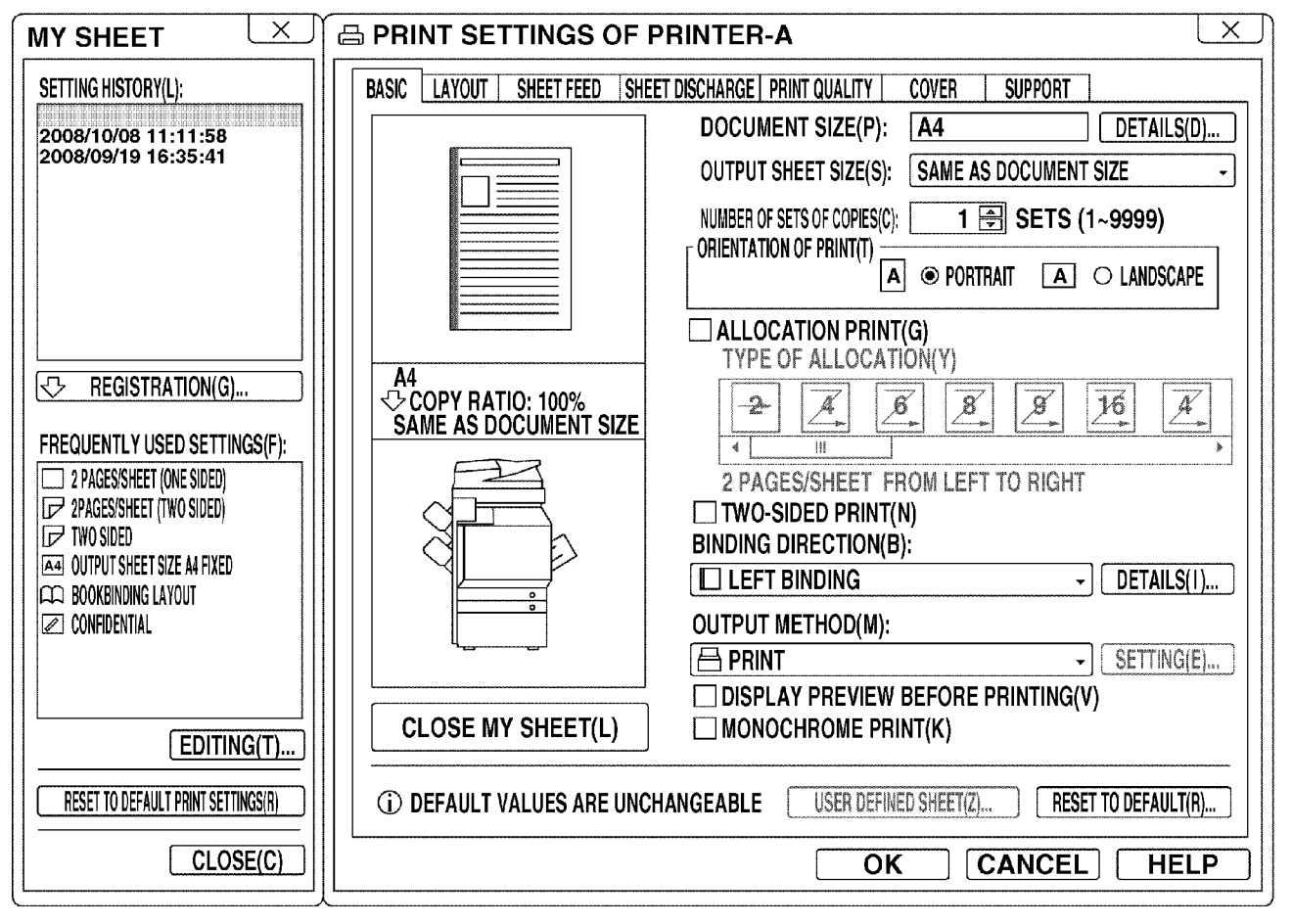

FIG. 14 illustrates an example of the user interface to be opened when the item "permit display only" is selected. According to the example illustrated in FIG. 14, user's operations and instructions are acceptable with respect to the control for opening another hierarchy (e.g., a details button and respective tabs). On the other hand, the controls for updating the default values of the print settings are all grayed out. When the user interface illustrated in FIG. 14 is displayed, the user can confirm the contents of the default values although the user cannot update the default values of the print settings.

In step S1511, the CPU 101 determines whether the determination target control is a control included in a basic page. The reason why the CPU 101 performs the above-described determination in step S1511 is because the function selected in the administrator setting item "value change permission with respect to printer properties" is "permit basic page only." In the present exemplary embodiment, the basic page is a property page that includes an assembly of representative setting items that are frequently used as print settings and selected from functions that can be set by the printer driver 303. Further, in a case where the interface includes a plurality of pages, the basic page is a page that is primarily displayed when the CPU 101 controls the monitor 1041 for the display of the user interface.

The print settings included in the basic page are, for example, sheet size, number of sets of copies, two-sided, and color. If it is determined that the determination target control is included in the basic page (YES in step S1511), the processing returns to step S1506. On the other hand, if it is determined that the control is not included in the basic page (NO in step S1511), the processing proceeds to step S1512. In step S1512, the CPU 101 grays out the determination target control.

The CPU 101 can call the API of the OS 310 to draw up a list of all controls included in a dialog or a property sheet. The CPU 101 can generate a list of the controls based on the basic page, and can search the list based on information of a selected control in determining whether the control is included in the basic page.

As described above, the CPU 101 can accept user's operations and instructions with respect to the representative controls included in the basic page (i.e., the page primarily displayed). Therefore, the user can easily perform the operation for updating the default values of the print settings. The user will not hesitate to perform the update operation even in a case where there are numerous functions that can be updated. Further, the user can freely update the print settings for frequently used functions. The CPU 101 can prevent a print result from being deteriorated (e.g., in tint) even when the user erroneously performs detailed settings for specific functions, such as troubleshooting.

Alternatively, the CPU 101 can permit the user to update the default values of the print settings not only in the basic page but also in an arbitrary page (one of a plurality of pages) included in the interface, while the CPU 101 can inhibit the user to update default values of the print settings included in other pages.

In this case, the CPU 101 can accept a user's update instruction if the page is an arbitrary page selected by the administrator. The CPU 101 does not accept any update instruction from the user if the page is a page other than the above-described arbitrary page. As described above, the CPU 101 can fix the default values of the print settings included in a page designated by the administrator.

If the above-described determination processing has been completed for all controls, then in step S1513, the CPU 101 determines whether the function selected in the administrator setting item "value change permission with respect to printer properties" is "permit basic page only" and the page to be displayed is the basic page. If it is determined that the function selected in the administrator setting item "value change permission with respect to printer properties" is "permit basic page only" and the page to be displayed is the basic page (YES in step S1513), the processing proceeds to step S1516. If it is determined that above-described conditions are not satisfied (NO in step S1513), the processing proceeds to step S1514.

In step S1514, the CPU 101 displays a message "default values are unchangeable." Then, in step S1515, the CPU 101 displays the user interface relating to the print settings that includes controls partly or entirely grayed out according to the content of the setting item "value change permission with respect to printer properties." In step S1516, the CPU 101 displays the user interface of the basic page that can accept user's operations and instructions.

The application 301 has the capability of changing user default values and standard default values of the print settings, using the API of the OS 310, independently of the printer driver 303. However, to update the default values of the print settings, it is necessary to generate updated values of the print settings to be written.

Figure 16:
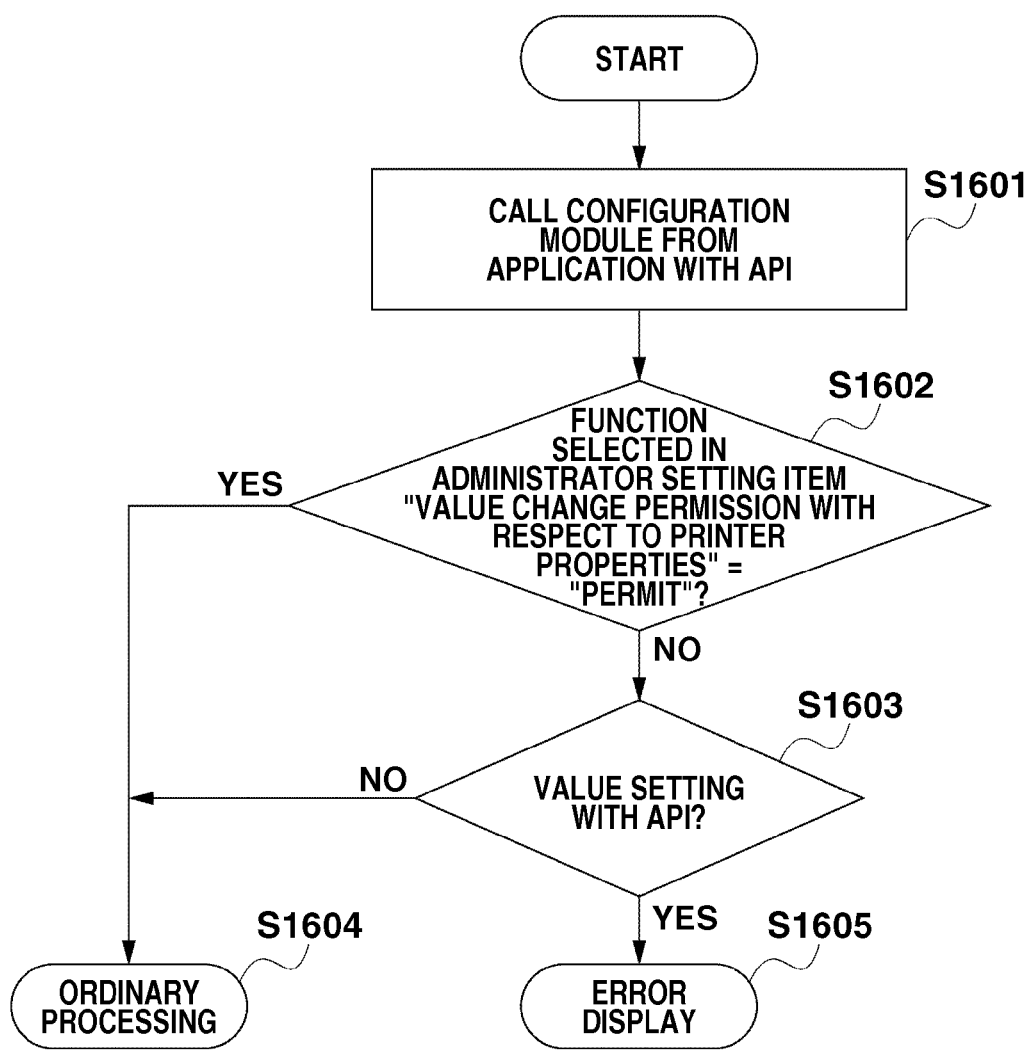
FIG. 16 is a flowchart illustrating processing that can be performed by the configuration module when an application changes print settings using an application programming interface according to an exemplary embodiment of the present invention.

Example processing for generating the updated values of the print settings with the API of the printer driver is described with reference to a flowchart illustrated in FIG. 16. To realize the following processing in respective steps, the CPU 101 executes the configuration module 3032 of the printer driver 303 and controls each of related constituent components of the application 301.

In step S1601, the CPU 101 calls the configuration module 3032 to change the print settings with the API. Then, in step S1602, the CPU 101 determines whether the function selected in the administrator setting item "value change permission with respect to printer properties" is "permit." If it is determined that the function selected in the administrator setting item "value change permission with respect to printer properties" is "permit" (YES in step S1602), the processing proceeds to step S1604. In step S1604, the CPU 101 performs ordinary processing.

On the other hand, if it is determined that the function selected in the administrator setting item "value change permission with respect to printer properties" is an item other than "permit" (NO in step S1602), the processing proceeds to step S1603. In step S1603, the CPU 101 determines whether the API is used to update the values of the print settings.

If it is determined that the API is used to update the values of the print settings (YES in step S1603), the processing proceeds to step S1605. In step S1605, the CPU 101 performs an error display without changing the print settings. Therefore, it is impossible to generate the updated print settings. As a result, it is impossible to update the default values of the print settings.

It may be useful to realize the function "permit basic page only" in combination with the function "permit display only." For example, only a button for opening the basic page and a button for opening another hierarchy are selectable and other items are all grayed out.

Further, the setting item "value change permission with respect to printer properties" can further include, in addition to the above-described four functions, a function for permitting changes on a page-by-page basis, a function for permitting changes on a function-by-function basis, and a function for permitting only a confirmation of a password displayed in a printing operation.

Further, the configuration module 3032 can provide a mechanism that does not usually permit users to change the default print settings via the user interface but, if the API is used, allows the users to change all of the print settings. Using the API to change the print settings and update the default values of the print settings is performed only in a specific application. Therefore, the above-described method is useful to substantially fix the default values.

As described above, the present exemplary embodiment can prevent the user default values and the standard default values of the print settings from being updated and can fix the print settings to the default values.

For example, the administrator can set preferable default values in fixing the print settings by selecting the function "do not permit" in the administrator setting item "value change permission with respect to printer properties" after updating the default values of the print settings beforehand.

Further, instead of perfectly fixing the values, the present exemplary embodiment enables users to use an ordinary user interface when print settings are performed via an application. The ordinary user interface permits the users to change the print settings from the default values to other values.

Further, disabled default values are displayed in a gray-out state on the user interface relating to the print settings. Therefore, users will not be confused even when the users cannot operate the controls. Moreover, a similar display can be realized even in a case where a printer driver is stored in a network server and only a user interface can be displayed by a client.

The present invention can be applied to a print processing system different from that described in the first exemplary embodiment. A second exemplary embodiment of the present invention is described below.

Figure 4:
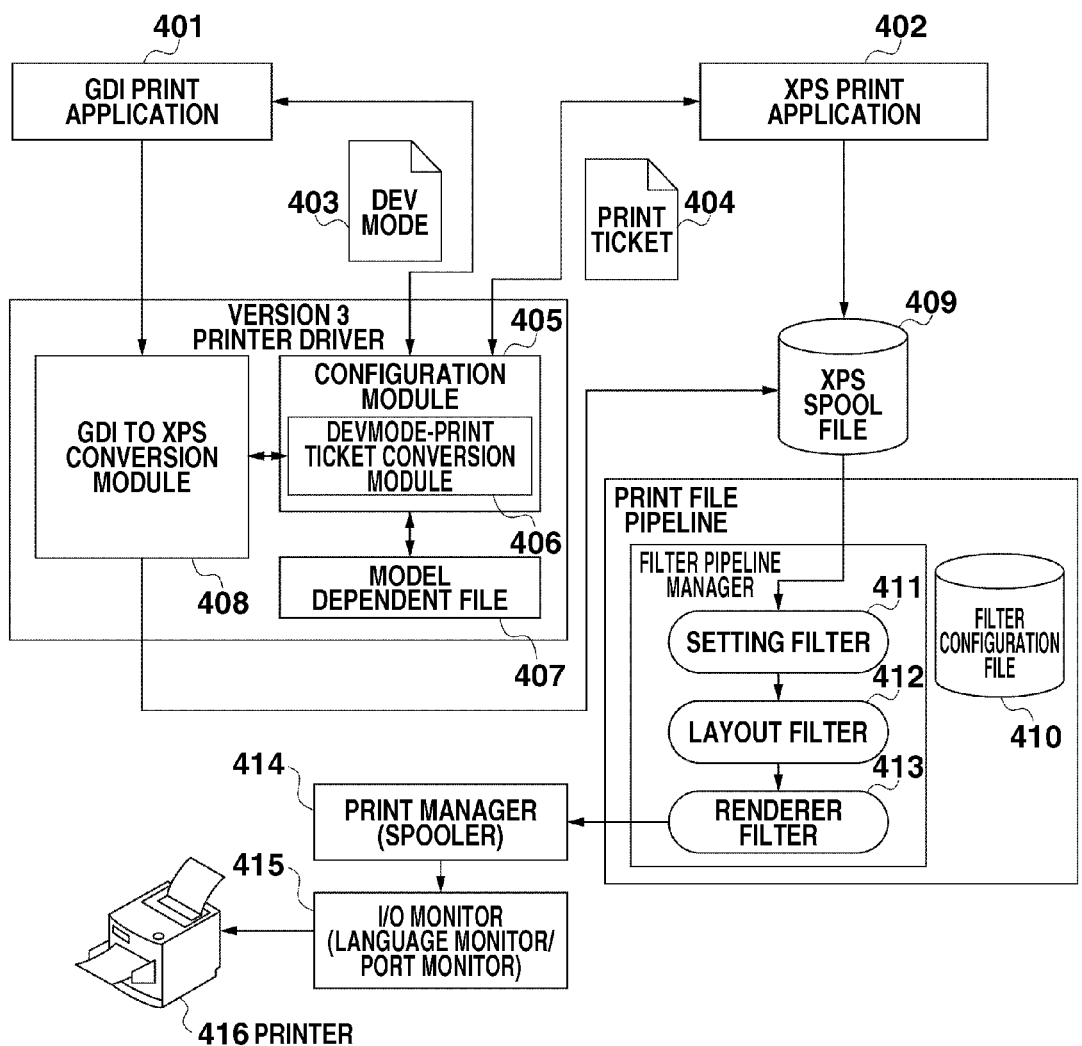
FIG. 4 is a block diagram illustrating an XPSDry print processing system according to an exemplary embodiment of the present invention.

FIG. 4 is a block diagram illustrating an example of an XPSDry print processing system. In the present exemplary embodiment, XPSDry represents a printer driver that can perform printing using a document file format, which is generally referred to as XML paper specification (XPS), as spool data. The XPSDry print processing system is operable on the OS and corresponds to the OS 1054 of the auxiliary storage apparatus 105 illustrated in FIG. 1.

A print manager 414 is a module included in the OS. A version 3 printer driver and each filter of a filter pipeline are stored, as the printer drivers 1053, in the auxiliary storage apparatus 105 illustrated in FIG. 1. A GDI application 401 and an XPS application 402 are stored, as the applications 1051, in the auxiliary storage apparatus 105 illustrated in FIG. 1.

A user can manipulate the input device 103, such as the keyboard 1031, to instruct print processing via the GDI print application program 401 (i.e., GDI application) or the XPS print application program 402 (i.e., the XPS application) whose interfaces are displayable on the output device 104. The print processing can be accomplished by sequentially performing three processes of selection of a printer, generation of print settings, and conversion of rendering data.

First, a user selects a printer 416 to be used for printing. In other words, the user selects a printer driver corresponding to the printer 416 that performs printing. Next, print settings are generated. To perform the print settings, an application secures a memory usable for print settings. The application or a configuration module 405 of the printer driver uses a model dependent file 407 to fill up setting data.

The GDI application 401 uses a binary DEVMODE structure 403 as print settings data. The XPS application 402 uses a print ticket 404 that is written in the markup language XML. Each of the DEVMODE structure 403 and the print ticket 404 includes, as illustrated in FIG. 5, a "Public" area that is defined by the OS and a "Private" area that can be defined by each printer driver.

Further, the print ticket 404 is print setting information written in an XML format as illustrated in FIG. 17. Therefore, the "Public" area and the "Private" area are discriminated from each other in name space. Either the DEVMODE structure 403 or the print ticket 404 stores print settings.

The user can directly change (rewrite) the print settings via an application. For example, the user can perform settings dedicated to the printer 416 by displaying a user interface of the printer driver stored in the configuration module 405 and by operating the displayed user interface. The printer driver changes the settings dedicated to the printer 416 in the DEVMODE structure 403 or the print ticket 404 according to the settings of the user interface.

Actual settings included in the print settings are, for example, designating "A4" as output sheet size, selecting two-sided printing as print method, switching between color print and monochrome print, and designating a sheet feeding stage. As the print settings of the print ticket 404 are written in the XML format, it is easy for the XPS application 402 to directly change (rewrite) all of the setting values. However, it is also useful to use a user interface of a printer driver to change the settings.

Finally, conversion of rendering data is performed. If the print settings are finalized, the user instructs print processing via the application. In a case where the GDI application 401 is used for printing, the rendering data is sent to a GDI to XPS conversion module 408 that is operable as a version 3 printer driver. The GDI to XPS conversion module 408 generates an XPS spool file 409. The version 3 printer driver is a printer driver that is compatible with Windows2000® and subsequent versions of Microsoft®. In this case, the GDI to XPS conversion module 408 calls the configuration module 405 and converts the print settings from the DEVMODE structure 403 to the print ticket 404.

In a case where the XPS application 402 is used for printing, there are two methods for generating an XPS file. More specifically, the XPS application itself generates an XPS file or the OS generates an XPS file according to a rendering command from the XPS application. In each method, the XPS spool file 409 can be generated during the print processing. As described above, the XPSDry printing system can surely generate the XPS spool file 409 during the print processing.

The generated XPS spool file 409 is then subjected to print filter pipeline processing. The print filter pipeline processing is a mechanism for performing a printing of the XPS spool file 409 through a plurality of filters. A filter configuration file 410 included in the print filter pipeline processing is usable to control the total number of the filters and the order of the filters.

In the present exemplary embodiment, a filter pipeline manager is operable in the print filter pipeline processing. The filter pipeline manager can sequentially perform processing of a setting filter 411, a layout filter 412, and a renderer filter 413 according to the filter configuration file 410.

The processing in each filter automatically starts in response to reception of the XPS spool file 409. Each filter modifies the XPS spool file 409 and sends the modified XPS spool file to the next filter. The filter pipeline manager finally outputs print data written in a printer control language (e.g., page description language (PDL)) that is a data language that can be processed by the printer.

In a case where the printer 416 is an XPS direct printer that can directly read the XPS spool file 409 and can perform printing based on the read XPS spool file 409, the processing to be performed by the above-described filters can be omitted.

The setting filter 411 performs processing for reading a print ticket and writing data required in printing into the print ticket. The layout filter 412 performs layout processing (e.g., change of copy ratio, bookbinding imposition layout, and stamp) according to the print ticket 404 included in the XPS spool file 409. Therefore, for example, if the print ticket 404 does not include any imposition settings, the layout filter 412 performs nothing and directly sends the XPS spool file 409 to the next filter.

The final renderer filter 413 renders the XPS spool file 409 and converts it into PDL data. The PDL data can be managed by the print manager 414, which manages a schedule of the print processing, so that print jobs are successively registered in queues. When the amount of PDL data is sufficient to perform printing, the PDL data are transmitted to the printer 416 via an I/O monitor 415 according to the registration order of the queues. As described above, a main role of the printer driver is receiving print data from an application and converting the print data into printer language data to perform actual print processing.

Even in a case where the above-described XPSDrv print processing system is used, a user interface of the configuration module 405 can be used to change (update) user default values and standard default values of the print settings. Accordingly, the flowcharts described in the first exemplary embodiment (see FIG. 11 and FIG. 15) can be used to fix the default values.

In a case where the print ticket 404 is used to change the print settings, the default values can be prevented from being changed by not permitting users to use the print ticket 404 in changing the settings, similar to the above-described first exemplary embodiment in which the API is used to change the print settings. Further, similar to the above-described case of the API, the configuration module 405 may be configured to switch the settings so as to permit users to change the print settings if the print ticket 404 is used.

Further, a storage medium that stores a computer-executable process for realizing the functions of the above-described exemplary embodiments according to the present invention can be supplied to an apparatus. A computer (or CPU or micro-processing unit (MPU)) provided in the apparatus can read the program code from the storage medium and execute the program code to realize the present invention.

In this case, the program code itself read out of the storage medium can realize the functions of the above-described exemplary embodiments. The storage medium storing the program code constitutes the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-121007 filed May 19, 2009, which is hereby incorporated by reference herein in its entirety.

What is claimed is:

1. An information processing apparatus that includes a printer driver that can generate print data to be transmitted to a printing apparatus according to a print instruction of an application, the information processing apparatus comprising:
a reception unit configured to accept a display instruction from a user to display a user interface of the printer driver;
a determination unit configured to determine whether the display instruction accepted by the reception unit is a first display instruction for updating default values relating to print settings of the printer driver or a second display instruction corresponding to the print instruction of the application; and
a control unit configured to cause a display unit to display a user interface that can accept an update instruction for updating the default values from the user in a case where the determination unit determines that the display instruction is the first display instruction and the update of the default values is permitted, cause the display unit to display a user interface that does not accept the update instruction in a case where the determination unit determines that the display instruction is the first display instruction and the update of the default values is not permitted, and cause the display unit to display a user interface that can accept a change instruction from the user to change the print settings from the default values to other values and does not permit the user to update the default values in a case where the determination unit determines that the display instruction is the second display instruction.

2. The information processing apparatus according to claim 1, wherein the control unit is configured to cause the display unit to display a user interface that does not accept the update instruction and enables the user to confirm the default values in a case where the determination unit determines that the display instruction is the first display instruction and the update of the default values is not permitted.

3. The information processing apparatus according to claim 2, wherein the control unit is configured to cause the display unit to display a user interface that can accept a user's instruction relating to a control for opening another hierarchy to confirm the default values.

4. The information processing apparatus according to claim 1, further comprising:
a setting unit configured to set whether to permit the user to update the default values,
wherein the control unit is configured to cause the display unit to display a user interface that can accept the update instruction for updating the default values in a case where the determination unit determines that the display instruction accepted by the reception unit is an instruction for displaying a user interface that enables the user to update the default values and the setting by the setting unit permits the update of the default values, and
the control unit is configured to cause the display unit to display a user interface that does not accept the update instruction in a case where the determination unit determines that the display instruction accepted by the reception unit is the instruction for displaying the user interface that enables the user to update the default values and the setting by the setting unit does not permit the user to update the default values.

5. The information processing apparatus according to claim 1, wherein the control unit is configured to cause the display unit to display a user interface that can accept a user's instruction relating to a control for opening another hierarchy and does not accept a user's instruction relating to a control different from the control for opening another hierarchy in a case where the determination unit determines that the display instruction is the first display instruction and a display of the default values is permitted even when the update of the default values is not permitted.

6. The information processing apparatus according to claim 1, wherein the user interface displayed by the control unit includes a plurality of pages, and the control unit is configured to cause the display unit to display a user interface that can accept an update instruction designating an arbitrary page of the plurality of pages from the user and does not accept an update instruction designating a page other than the arbitrary page from the user in a case where the determination unit determines that the display instruction is the first display instruction and the update of default values of the print settings that are included in the arbitrary page of the plurality of pages is permitted, and the update of default values that are included in a page other than the arbitrary page is not permitted.

7. The information processing apparatus according to claim 6, wherein the arbitrary page is a page that is primarily displayed among the plurality of pages included in the user interface when the control unit causes the display unit to display the user interface.

8. An information processing apparatus that includes a printer driver that can generate print data to be transmitted to a printing apparatus according to a print instruction of an application, the information processing apparatus comprising:
a reception unit configured to accept a display instruction from a user to display a user interface of the printer driver;
a determination unit configured to determine whether the display instruction accepted by the reception unit is a first display instruction for updating default values relating to print settings of the printer driver or a second display instruction corresponding to the print instruction of the application; and
a control configured to cause the display unit to display a user interface that can accept an update instruction for updating the default values from the user in a case where the determination unit determines that the display instruction is the first display instruction and the update of the default values is permitted, and cause the display unit to display a user interface that does not permit the user to update the default values in a case where the determination unit determines that the display instruction is the first display instruction and the update of the default values is not permitted.

9. A method for controlling an information processing apparatus that includes a printer driver that can generate print data to be transmitted to a printing apparatus according to a print instruction of an application, the method comprising:
accepting a display instruction from a user to display a user interface of the printer driver;
determining whether the accepted display instruction is a first display instruction for updating default values relating to print settings of the printer driver or a second display instruction corresponding to the print instruction of the application; and
causing a display unit to display a user interface that can accept an update instruction for updating the default values from the user in a case where it is determined that the display instruction is the first display instruction and the update of the default values is permitted, causing the display unit to display a user interface that does not accept the update instruction in a case where it is determined that the display instruction is the first display instruction and the update of the default values is not permitted, and causing the display unit to display a user interface that can accept a change instruction from the user to change the print settings from the default values to other values and does not permit the user to update the default values in a case where it is determined that the display instruction is the second display instruction.

10. A method for controlling an information processing apparatus that includes a printer driver that can generate print data to be transmitted to a printing apparatus according to a print instruction of an application, the method comprising:
accepting a display instruction from a user to display a user interface of the printer driver;
determining whether the accepted display instruction is a first display instruction for updating default values relating to print settings of the printer driver or a second display instruction corresponding to the print instruction of the application; and
causing the display unit to display a user interface that can accept an update instruction for updating the default values from the user in a case where it is determined that the display instruction is the first display instruction and the update of the default values is permitted, and causing the display unit to display a user interface that does not permit the user to update the default values in a case where it is determined that the display instruction is the first display instruction and the update of the default values is not permitted.

11. A computer-readable storage medium that stores a computer-executable process that causes a computer to implement a method to control an information processing apparatus that includes a printer driver that can generate print data to be transmitted to a printing apparatus according to a print instruction of an application, the method comprising:
accepting a display instruction from a user to display a user interface of the printer driver;
determining whether the accepted display instruction is a first display instruction for updating default values relating to print settings of the printer driver or a second display instruction corresponding to the print instruction of the application; and
causing a display unit to display a user interface that can accept an update instruction for updating the default values from the user in a case where it is determined that the display instruction is the first display instruction and the update of the default values is permitted, causing the display unit to display a user interface that does not accept the update instruction in a case where it is determined that the display instruction is the first display instruction and the update of the default values is not permitted, and causing the display unit to display a user interface that can accept a change instruction from the user to change the print settings from the default values to other values and does not permit the user to update the default values in a case where it is determined that the display instruction is the second display instruction.

12. A computer-readable storage medium that stores a computer-executable process that causes a computer to implement a method to control an information processing apparatus that includes a printer driver that can generate print data to be transmitted to a printing apparatus according to a print instruction of an application, the method comprising:
accepting a display instruction from a user to display a user interface of the printer driver;
determining whether the accepted display instruction is a first display instruction for updating default values relating to print settings of the printer driver or a second display instruction corresponding to the print instruction of the application; and causing the display unit to display a user interface that can accept an update instruction for updating the default values from the user in a case where it is determined that the display instruction is the first display instruction and the update of the default values is permitted, and causing the display unit to display a user interface that does not permit the user to update the default values in a case where it is determined that the display instruction is the first display instruction and the update of the default values is not permitted.

* * * * *